(12) United States Patent
Hellin Navarro

(10) Patent No.: US 11,333,312 B2
(45) Date of Patent: May 17, 2022

(54) OVER-MOLDED LIGHTING DEVICE FOR LAMP ASSEMBLY

(71) Applicant: FICOSA NORTH AMERICA CORPORATION, Madison Heights, MI (US)

(72) Inventor: Sergio Hellin Navarro, Bloomfield Hills, MI (US)

(73) Assignee: FICOSA NORTH AMERICA CORPORATION, Madison Heights, MI (US)

( * ) Notice: Subject to any disclaimer, the term of this patent is extended or adjusted under 35 U.S.C. 154(b) by 119 days.

(21) Appl. No.: 16/817,175

(22) Filed: Mar. 12, 2020

(65) Prior Publication Data
US 2021/0285614 A1 Sep. 16, 2021

(51) Int. Cl.
*F21S 41/25* (2018.01)
*F21V 31/04* (2006.01)
*F21V 23/00* (2015.01)

(52) U.S. Cl.
CPC ............ *F21S 41/25* (2018.01); *F21V 23/001* (2013.01); *F21V 23/005* (2013.01); *F21V 31/04* (2013.01)

(58) Field of Classification Search
CPC ............... B60Q 1/2665; B60Q 1/323; F21S 41/20–285; F21S 43/14–51; F21S 45/50; F21V 23/001–006; F21V 31/04; F21W 2102/40
USPC .......................................... 362/494, 509–511
See application file for complete search history.

(56) References Cited

U.S. PATENT DOCUMENTS

| | | | |
|---|---|---|---|
| 7,712,933 B2 | 5/2010 | Fleischmann et al. | |
| 7,815,339 B2 | 10/2010 | Veenstra et al. | |
| 7,909,482 B2 | 3/2011 | Veenstra et al. | |
| 8,230,575 B2 | 7/2012 | Veenstra et al. | |
| 9,434,313 B2 * | 9/2016 | Minikey, Jr. | B60R 1/12 |
| 2015/0224919 A1 * | 8/2015 | Sobecki | G02B 3/02 29/407.01 |
| 2019/0270403 A1 * | 9/2019 | Sobecki | G02B 7/021 |

* cited by examiner

*Primary Examiner* — Jason M Han
(74) *Attorney, Agent, or Firm* — Brooks Kushman, P.C.

(57) ABSTRACT

A vehicle lighting assembly may include a housing including a lower part, the lower part defining an opening; and a lighting device arranged within the housing and configured to emit light through the opening, the lighting device including at least one circuit board and a lens arranged on the circuit board, the lighting device further including a single overmolded encapsulate configured to encase the circuit board and at least a portion of the lens.

9 Claims, 6 Drawing Sheets

OVER-MOLDED LIGHTING DEVICE FOR LAMP ASSEMBLY

TECHNICAL FIELD

Disclosed herein is an over-molded lighting device for lamp assemblies.

BACKGROUND

Motor vehicles include various exterior and interior lamps for increasing visibility during non-daylight hours. These lamps may be automatic, and may include head-lamps, interior running lights, etc. Other winglets and lamps may provide information to the driver such as blind spot detection (BSD) alerts.

SUMMARY

A vehicle lighting assembly may include a housing including a lower part, the lower part defining an opening; and a lighting device arranged within the housing and configured to emit light through the opening, the lighting device including at least one circuit board and a lens arranged on the circuit board, the lighting device further including a single overmolded encapsulate configured to encase the circuit board and at least a portion of the lens.

A vehicle lighting device for a vehicle winglet may include at least one circuit board; at least one lens arranged on the circuit board; and an encapsulate configured to encase the circuit board and at least a portion of an outer periphery of the lens.

A method for manufacturing a vehicle lighting device for a vehicle winglet, may include assembling at least one lens on a circuit board; placing a mold over the assembly; injecting a liquid material into the mold; removing the assembly from the mold; and inserting the assembly into the vehicle winglet.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a lighting device for a vehicle lamp assembly where the lighting device includes an encapsulate over at least a portion of a lens and a circuit board. Traditionally, such lighting devices are sealed with a cover and then clamped to the back of a circuit board. However, this may require lengthy steps and curing times. The disclosed encapsulate may be over-molded to the lens and circuit board assembly in a single step and be ready for installation without the need for curing the materials, joints, or adhesives. The welding process typically required to manufacture such lighting devices may be eliminated and replaced with two or three injection tools. The devices and processes described herein create an easy, economical solution to tedious manufacturing, all while having a low initial tooling investment.

Figure 1:
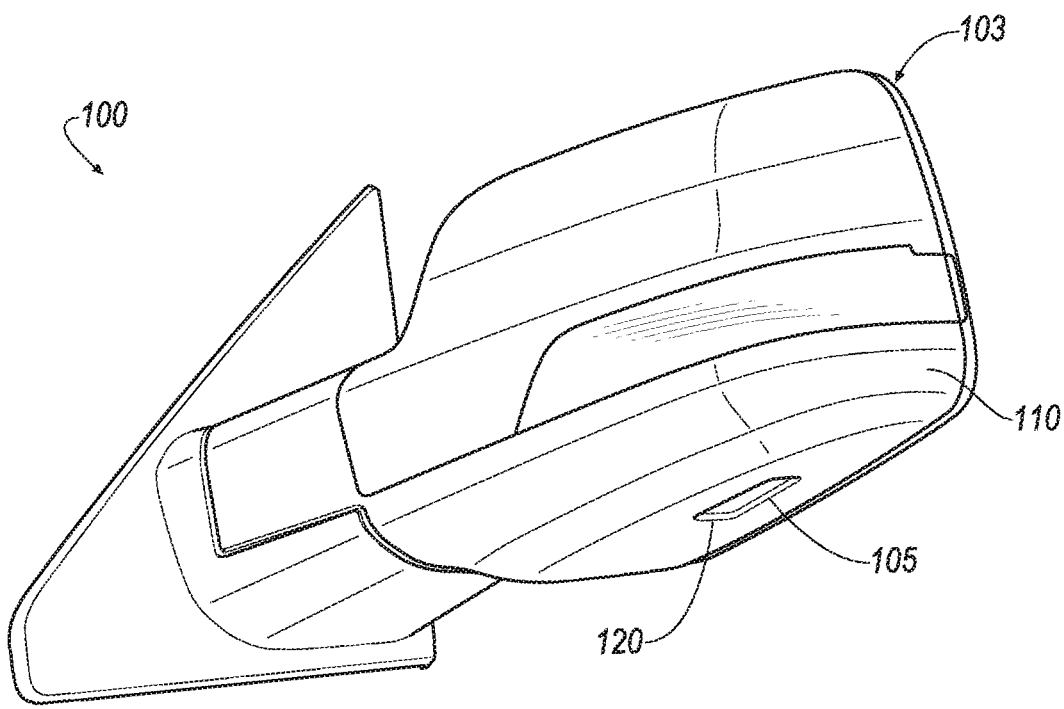
FIG. 1 illustrates a perspective view of an example lighting assembly for a vehicle.

FIG. 1 illustrates a perspective view of an example lighting assembly 100 for a vehicle. The lighting assembly 100 may be part of a at least one winglet, such as a vehicle mirror (as shown in FIG. 1) or camera or radar. The lighting assembly may also be a roof rack, door handle, or other protrusion of the vehicle or vehicle component. In the examples herein, the lighting assembly 100 may be described as a downward facing puddle lamp. The lighting assembly 100 may include a housing 103 configured to house a lighting device 105. The lighting device 105 may be configured to create an illuminated area at or near the vehicle. The lighting device 105 may also be configured to illuminate an image at the device 105 to indicate the presence of an object to the driver of the vehicle. For example, the lighting device 105 may be used as a blind spot detector (BSD) and alert the driver to an object in a blind spot of the vehicle.

The vehicle may be any motor passenger vehicle including but not limited to a truck, sport utility vehicle, truck, cross-over, hatchback, station wagon, motorcycle, all-terrain vehicle (ATV), recreational vehicle (RV), boat, plane or other mobile machine for transporting people or goods, etc.

While the lighting device 105 is described throughout as being arranged on the lighting assembly 100, the lighting device 105 may also be mounted on other exterior areas of the vehicle. For example, the lighting device 105 may be arranged on a door handle, running boards, mud flaps, roof racks, bumpers, etc. The vehicle may include more than one lighting assembly 100. In one example, a lighting assembly 100 be arranged on each side view mirror, winglet and/or on each door handle.

The lighting assembly 100 may include a lower cover 110 configured to enclose a lower part of the assembly 100. The lower cover 110 may define an opening 120. The opening 120 may be configured to expose at least a portion of the lighting device 105.

Figure 2:
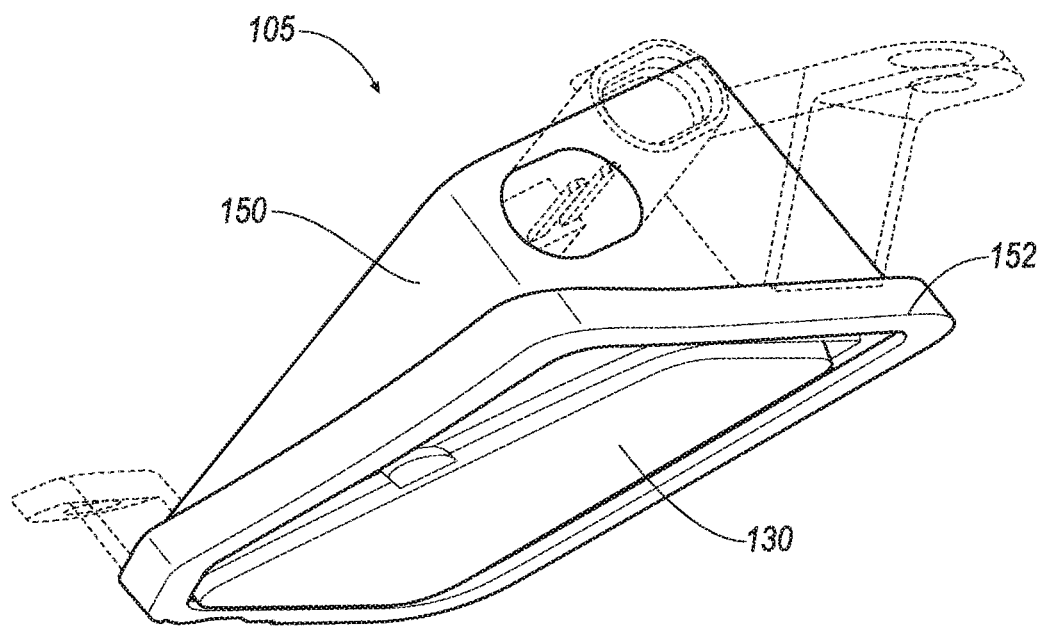
FIG. 2 illustrates a perspective view of an example lighting device of the lighting assembly of FIG. 1.
Figure 3:
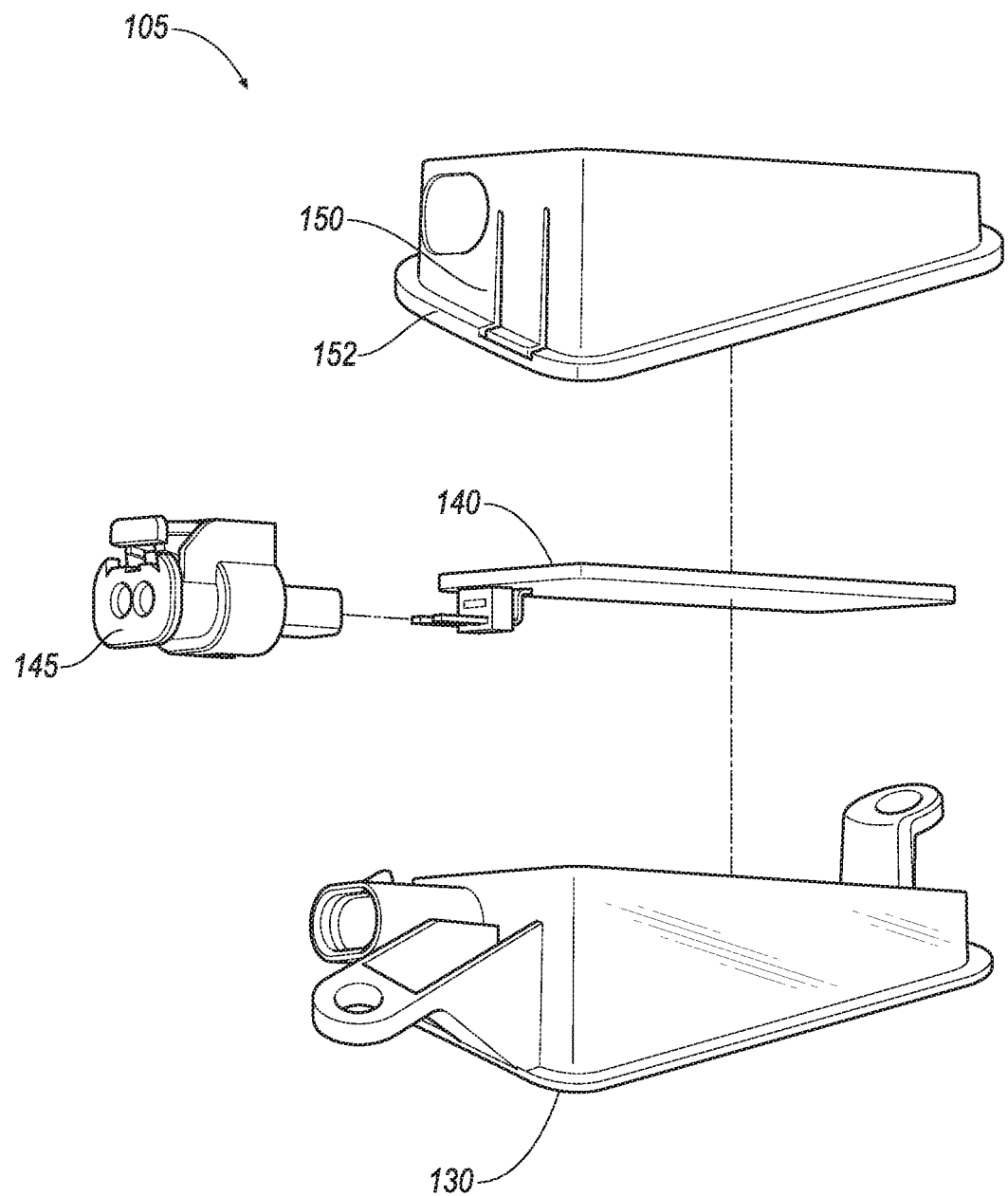
FIG. 3 illustrates an exploded view of the lighting device of FIG. 2.

FIG. 2 illustrates a perspective view of the lighting device 105 of the lighting assembly 100 of FIG. 1. FIG. 3 illustrates an exploded view of the lighting device 105 of FIG. 2. The lighting device 105 may include an optical lens 130. The optical lens 130 may reflect or bend light emitting from the lighting device 105. While referred to herein as a lens 130, the lens 130 may also be or include an optical prism, film, etc. The lighting device 105 may include a controller or printed circuit board (PCB) 140. The PCB 140 may be coupled to a memory (not shown) and may be configured to control the illumination of the lighting device 105.

The PCB 140 may include a connector 145 and at least one power supply cord 147 (shown in FIG. 4) configured to transmit power to the PCB 140. The connector 145 may be an aerial JST connector or similar connector configured to connect the wires or cord 147 to the PCB 140. The cord 147 may supply power to the PCB 140. Additionally or alternatively, the PCB 140 may include one or more terminals for connection to a power supply.

The lighting device 105 may include an encapsulate 150 configured to seal the lens over the PCB 140. The encapsulate 150 may be over-molded onto the lens 130 to secure the lens 130 and the PCB 140. Over-molding allows for a plastic-like material to cover, or partially cover another part. In this case, the PCB 140 and lens 130 may be covered, or partially covered, by over-molding. In one example, low pressure molding (LPM) and potting may be used.

During manufacturing, the lens 130 may be placed on the PCB 140. This assembly may then be placed in an over-mold machine. The machine may place the plastic over-mold material over at least a portion of the assembly. This allows the lens 130 and PCB 140 to be contained without the need for a clamped cover over the PCB 140. This process also eliminates any curing time required by traditional methods, some of which may take up to 24 hours. The tooling required is greatly reduced as a single over-mold process can be used instead of gluing, clamping, etc.

The encapsulate 150 may be formed of various materials via the over-molding. In one example, the encapsulate 150 may be a polyamide hot melt. Other thermoplastic elastomers may also be used, such as, but not limited to, copolymers, polyolefinesastomers, vulcanizate, polyurethanes, copolyester, polyamides, etc.

Figure 4:
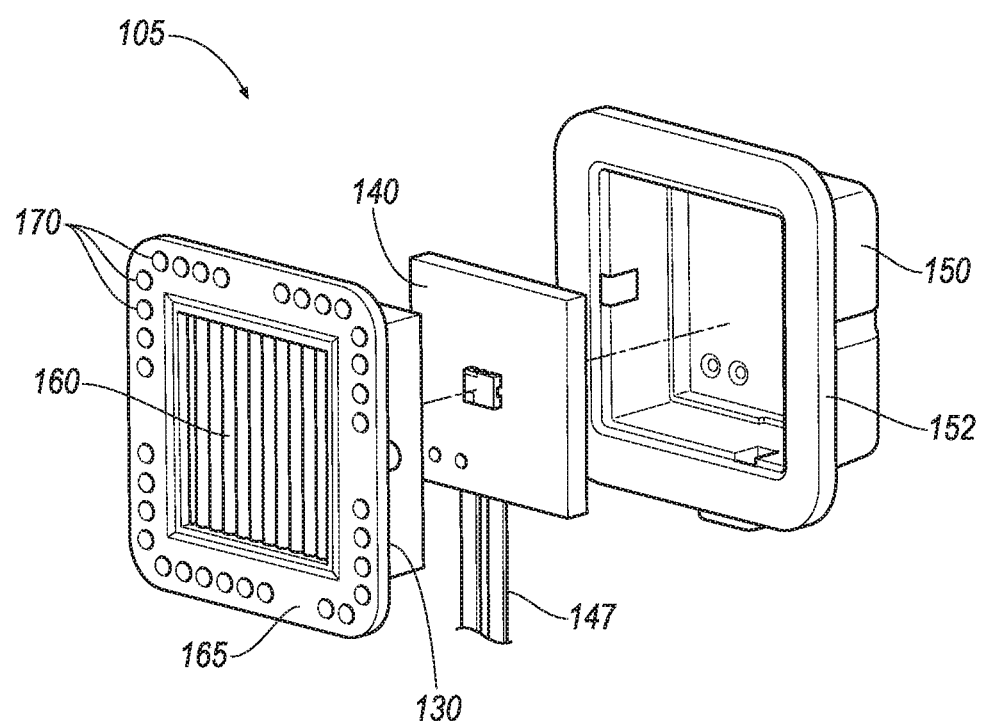
FIG. 4 illustrates an exploded perspective view of an example lighting device.

FIG. 4 illustrates an exploded perspective view of the lighting device 105. In this example, at least one cable or cord 147 extends from the PCB 140. The lens 130 is configured to be arranged adjacent the PCB 140. The encapsulate 150 is configured to be over-molded over at least a portion of the lens 130 and the PCB 140. The encapsulate 150 may define a lip 152 around the outer periphery. This lip 152 may abut the outer periphery 165 of the lens and maintain the lens 130 within the encapsulate 150 while exposing a portion of the lens 130. Also, the lip 152 may reduce the rattling noise/sound and reduce clearance gap, thus removing the need for a gasket or other sealant.

The periphery 165 of the lens 130 may define a plurality of holes 170 therearound. During manufacturing, these holes 170 may be configured to receive over-mold (e.g., from the lip 152) and thus create a lock-like engagement with the encapsulate 150. As explained, the encapsulate 150 forms the lip 152 over the periphery 165 of the lens and circuit board so as to maintain the lens 130 and the PCB 140 within the encapsulate 150 while leaving a portion of the lens 130 exposed. That is, a portion of front face 160 of the lens 130 is not covered by the encapsulate 150.

Figure 5:
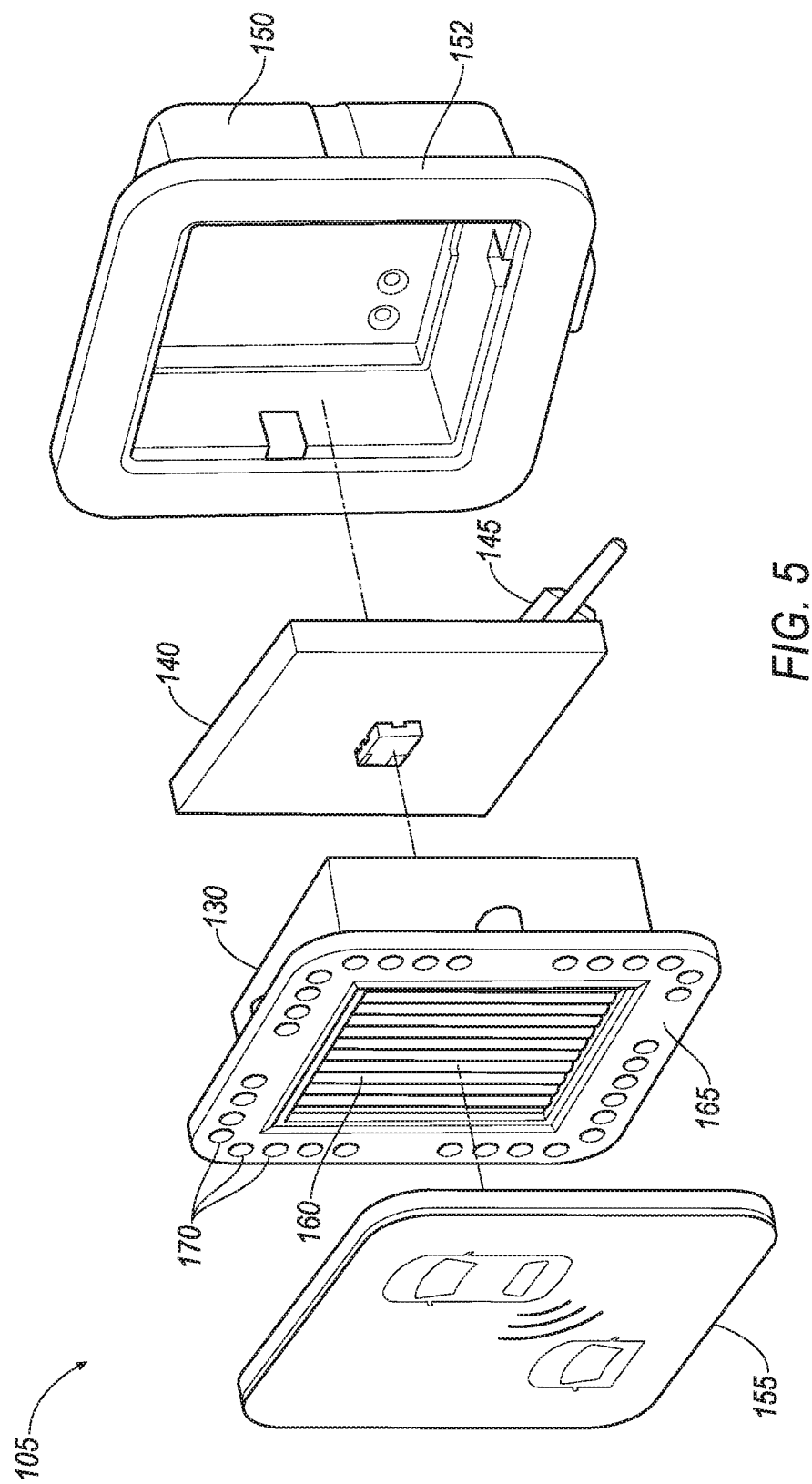
FIG. 5 illustrates an exploded perspective view of another example lighting device.

FIG. 5 illustrates an exploded view of another example lighting device 105. Similar to FIG. 4, the device 105 includes the PCB 140 and the lens 130. FIG. 5 illustrates a film or mask filter 155 configured to project a certain image, indicia, or anagram. For example, the image may include a logo, icon or picture relating to the vehicle, such as the vehicle's trademark, etc. The image may include both black and white, as well as colored images. In one example, the image may be a BSD alert. The encapsulate 150 may, similar to FIG. 4, be over-molded onto the lens 130. Further, similar to FIG. 4, a lock-like engagement may be created with the encapsulate 150.

Figure 6:
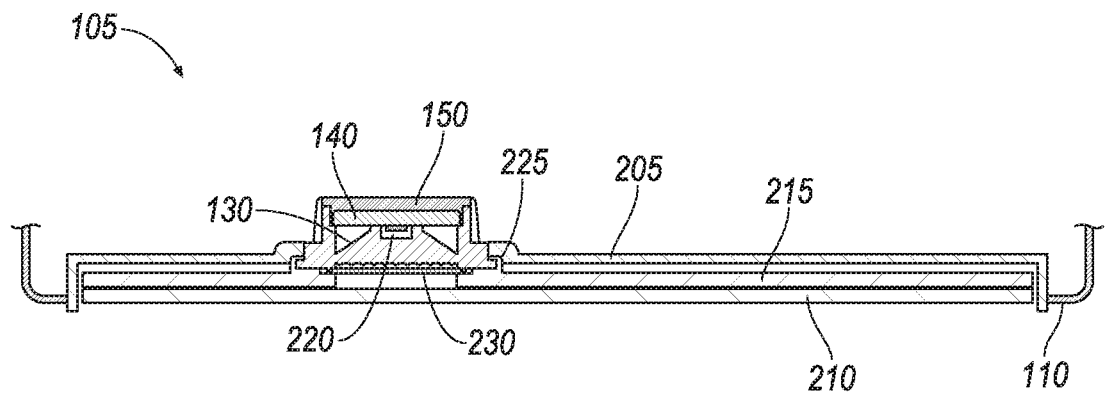
FIG. 6 illustrates an example cross-sectional view of a portion of the lighting assembly.
Figure 7:
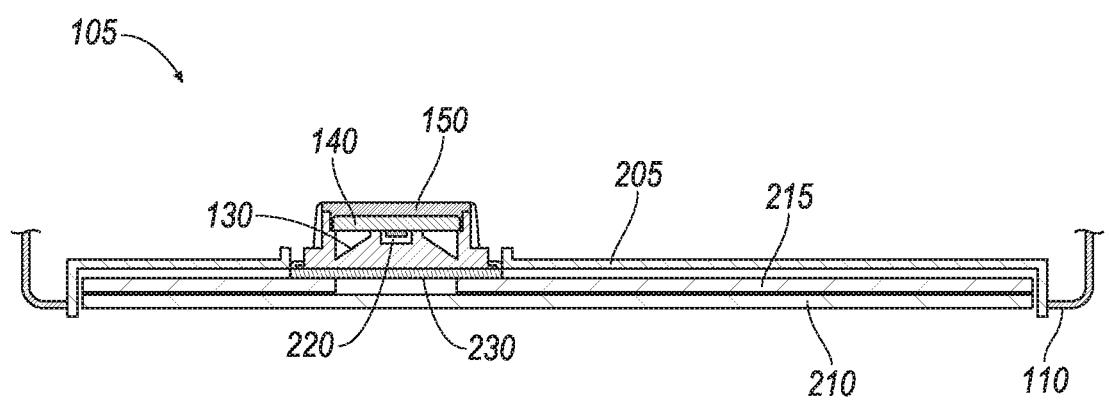
FIG. 7 illustrates another example cross-sectional view of a portion of the lighting assembly.
Figure 8:
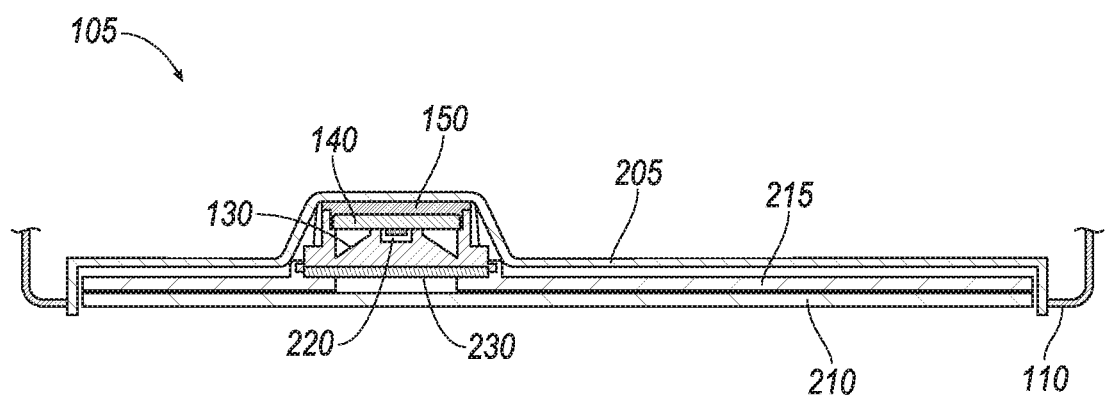
FIG. 8 illustrates yet another example cross-sectional view of a portion of the lighting assembly.

FIGS. 6-8 illustrate cross-sectional views of other examples of a lighting device 105. In these examples, the lighting assembly 100 may include a mirror glass plane with a lighting device, located behind the mirror glass, providing illumination/icon through the mirror glass. Each example is described in more detail below.

FIG. 6 illustrates a cross-sectional view of a portion of another example lighting assembly 100, where the example lighting device 105 includes a backplate flange 205 arranged adjacent the lens 130 and within the lower cover 110 or housing 103 of the lighting assembly 100. The backplate flange 205 may be a mirror backplate and not necessarily a backplate to the cover 110. In this example, the backplate flange 205 may aid in supporting the lens 130 and/or the encapsulate 150 of the lighting device 105 via a lip 225 abutting the exterior periphery of the lens 130. A mirror or glass cover 210 may be arranged on the encapsulate 150. The glass cover 210 may be adhered to the backplate flange 205 via an adhesive 215. The adhesive may be any type of adhesive including, but not limited to, glue, epoxy, polyurethane, spray adhesive, heated adhesive, hot glue, etc. The adhesive 215 may be arranged between the glass cover 210 and the backplate flange 205. The adhesive 215 may also come into contact with a portion of the encapsulate 150.

A light source 220 may be arranged within the lens abutting the PCB 140. The light source 220 may be a light emitting diode (LED) or plurality of LEDs configured to emit light from the lens 130. This may be intended to light up an area near the vehicle. The light may include a white light or color light. As explained with respect to FIG. 5, a film 230 having an image, indicia, anagram, or the like may be included in the lighting device 105. This film 230 may be held in place by the over-molded encapsulate 150 and may not require an additional manufacturing step to secure the film within the device 105.

The film 230 may allow certain light to pass through the film 230, while blocking other light, in order to generate the image. The film 230 may be interchangeable at the manufacturing stages in order to customize the image for each vehicle.

The film 230 may also include various filters configured to aid in generating the image or logo. The optical filters may selectively transmit lights of different wavelengths. For example, a color filter may generate a color logo or image. The filters may be absorptive or dichroic. The filters may be selected during manufacturing depending on the type of image to be projected.

FIG. 7 illustrates another example cross-sectional view of a portion of the lighting assembly 100, where the example lighting device 105 includes a backplate flange 205 arranged adjacent the lens 130 and within the lower cover 110 or housing 103 of the lighting assembly 100 similar to the example in FIG. 6. In this example, the backplate flange 205 may run up to, but not include a lip for engaging the lens 130.

FIG. 8 illustrates yet another example cross-sectional view of a portion of the lighting assembly 100, where the example lighting device 105 includes a backplate flange 205 arranged adjacent the lens 130 and within the lower cover 110 or housing 103 of the lighting assembly 100. In this example, the backplate flange 205 may extend around the entire lens and encapsulate 150. The backplate flange 205 may be clipped to an actuator (not shown) located behind mirror glass and within housing 103. The actuator may allow the mirror glass module to rotate and pivot according to user preferences.

Figure 9:
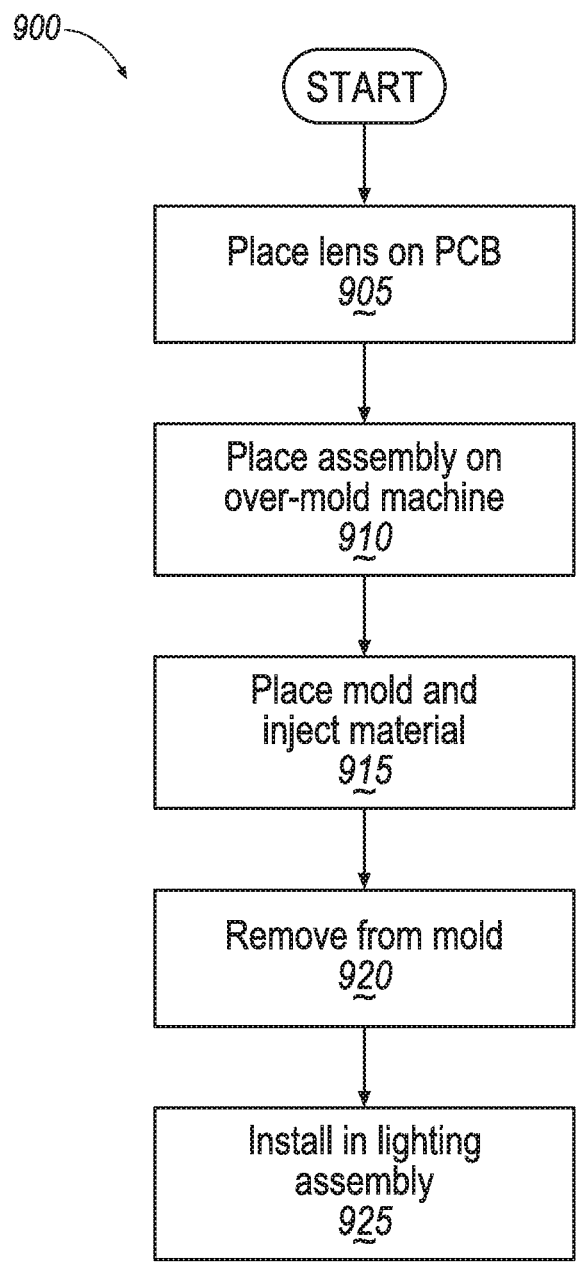
FIG. 9 illustrates an example manufacturing process of the lighting device.

FIG. 9 illustrates an example manufacturing process 900 of the lighting device 105. At block 905, the lens 130 may be arranged on the PCB 140.

At block 910, this assembly may then be placed on an over-mold machine. At block 915, an over-mold may then be placed on the assembly. During the over-molding, a hot liquid polyamide material may be injected at a very low pressure into a relative cold mold set. This polyamide may have low viscosity, allowing the material to flow into the mold-set and encapsulate the assembly. As soon as the polyamide enters the mold-set, the material starts to cool. Because the mold-set is filled quickly, the poured material cools relatively quickly. The entire mold setting may take only 10 to 80 seconds, but the time may increase if the injection molding is more complex or the number of cavities to be injected is higher.

Notably, continuous injection pressure may be applied to the mold-set in order to compensate for any shrinkage caused during the transition of the polyamide from liquid to solid as it cools. The temperature of the liquid polyamide is hot but not hot enough to damage the PCB 140 or lens 130. This, coupled with the fact that the mold-set absorbs most of the heat, allows the hot liquid to not re-melt or re-flow the components of the PCB 140.

At block 920, the assembly may be removed from the mold. At block 925, the assembly may be installed in the lighting assembly 100.

Because of the over-molding, the PCB 140 is contained without the need for a clamped cover over the PCB 140. Thus, the circuit board and lens may be combined, then overmolded, then inserted into the lighting assembly. Previously, the circuit board and lens may have been welded, then inserted into an oven for annealing, followed by a gasket being installed around the lens perimeter, all prior to being inserted in the lighting assembly. The described apparatus allows for a simplified manufacture and lower costs.

Computing devices described herein generally include computer-executable instructions, where the instructions may be executable by one or more computing or hardware devices, such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle lighting assembly, comprising:
   a housing including a lower part, the lower part defining an opening; and
   a lighting device arranged within the housing and configured to emit light through the opening, the lighting device including at least one circuit board and a single lens arranged directly on the circuit board, the lighting device further including a single overmolded encapsulate configured to encase the circuit board and at least a portion of the lens,
   wherein the encapsulate is over-molded over at least a portion of the lens, with a portion of the lens not being covered by the encapsulate, wherein the encapsulate forms a lip directly over a periphery of the lens and the circuit board so as to maintain the lens and the circuit board within the encapsulate while leaving a portion of the lens exposed, and further wherein the lens includes a single film configured with an indicia located on the encapsulate lip.

2. The assembly of claim 1, wherein the encapsulate is a polyamide material.

3. The assembly of claim 1, further comprising a backplate arranged adjacent the encapsulate to maintain the lens within the backplate.

4. The assembly of claim 3, further comprising a reflective surface arranged adjacent the lens.

5. The assembly of claim 1, wherein the circuit board includes at least one of a connector, wire, or terminal configured to receive at least one power supply cord.

6. A vehicle lighting device for a vehicle winglet, comprising:
   at least one circuit board;
   at least one lens arranged on the circuit board; and
   an encapsulate configured to encase the circuit board and at least a portion of an outer periphery of the lens, wherein the encapsulate is over-molded over an outer periphery of the lens forming a lip over the outer periphery of the lens and the circuit board so as to maintain the lens and the circuit board within the encapsulate while leaving a portion of the lens exposed, and further wherein the lens includes a single film configured with an indicia located on the encapsulate lip.

7. The device of claim 6, wherein the encapsulate is a polyamide material.

8. The device of claim 6, further comprising a backplate arranged adjacent the encapsulate to maintain the encapsulate within a housing.

9. The device of claim 8, further comprising a glass cover arranged adjacent the lens and attached to the backplate via an adhesive.

* * * * *